Figure 1:
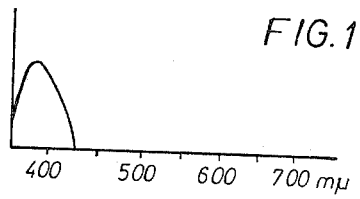

United States Patent

Kampfer et al.

[15] 3,635,706
[45] Jan. 18, 1972

[54] SENSITIZED ELECTROPHOTOGRAPHIC LAYERS

[72] Inventors: Helmut Kampfer; Hans Öhlschläger, both of Cologne, Stammheim; Wolf Gesierich, Leverkusen, all of Germany

[73] Assignee: AGFA-Gevaert Aktiengesellschaft, Leverkusen, Germany

[22] Filed: May 18, 1966

[21] Appl. No.: 551,033

[30] Foreign Application Priority Data

May 29, 1965 Germany..............................A 49348

[52] U.S. Cl..............................................96/1.7, 260/240.9
[51] Int. Cl. ........................................................G03g 5/08
[58] Field of Search......................96/1.6, 1.7, 89, 102, 106; 260/240.9

[56] References Cited

UNITED STATES PATENTS

| | | |
|---|---|---|
| 2,393,743 | 1/1946 | Brooker et al. ...............260/240.9 X |
| 3,121,006 | 2/1964 | Middleton et al........................96/1.5 |
| 3,245,786 | 4/1966 | Cassiers et al. ..........................96/1.8 |
| 3,238,149 | 3/1966 | Spurr ..................................96/1.7 X |
| 3,279,918 | 10/1966 | Cassiers et al. ..........................96/1.5 |
| 2,385,747 | 9/1945 | Freyberg et al......................96/102 X |
| 2,693,416 | 11/1954 | Butterfield..............................96/1.4 |
| 2,721,799 | 10/1955 | Edwards et al. .........................96/102 |
| 3,052,540 | 9/1962 | Greig......................................96/1.7 |
| 3,246,983 | 4/1966 | Sus et al..................................96/1.5 |
| 3,257,394 | 6/1966 | Cohen ................................260/240.9 |
| 3,352,670 | 11/1967 | Coles........................................96/1.7 |

Primary Examiner—Charles E. Van Horn
Attorney—Connolly and Hutz

[57] ABSTRACT

This invention relates to the optical sensitization with styryl dyes of electrophotographic materials, preferably containing zinc oxide as the photoconductor.

6 Claims, 7 Drawing Figures

INVENTORS:
HELMUT KAMPFER, HANS ÖHLSCHLÄGER, WOLF GESIERICH.

BY Connolly and Hutz

ATTORNEYS

SENSITIZED ELECTROPHOTOGRAPHIC LAYERS

It is already known that photoconductive layers whose inherent sensitivity is generally in the ultraviolet region of the spectrum, can be sensitized with respect to visible light by the addition of dyes capable of transmitting radiant energy. The dyes which have been proposed for this purpose are members of a variety of groups for example, triphenylmethane dyes, phenolsulphone phthaleins, xanthene and acridine dyes, and cyanines, merocyanines and oxonoles belonging to the polymethine group of dyes.

Unfortunately, the known dyes have the disadvantage that either they produce an inadequate increase in sensitivity, or else they color the electrophotographic layer to an extent beyond the acceptable limit. In general, however, it is only possible to use colorless or practically colorless layers. The second of these two disadvantages is particularly troublesome in the case of electrophotographic materials because the sensitizing dyes used cannot be washed out by the usual methods or eliminated by baths. Removal of the sensitizing dyes by bleaching following production of the image is complicated and is economically unfavorable.

The object of the invention is to develop optically sensitized electrophotographic layers which preferably contain zinc oxide as the photoconductor, are as color free as possible and whose sensitivity remains unaffected by storage. It has now been found that dyes corresponding to the general formula

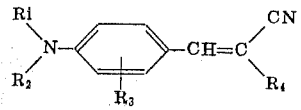

are eminently suitable for sensitizing electrophotographic layers, preferably zinc oxide layers, where:

$R_1$ and $R_2$ represent hydrogen; alkyl with preferably up to 20 carbon atoms, more particularly an alkyl with up to eight carbon atoms, the alkyl radicals being optionally substituted by carboxyl, esterified carboxyl, in particular with aliphatic alcohols with up to 20 carbon atoms, esterified carboxy, carbonamide, alkyl-substituted carbonamide, nitrile, halogen such as chlorine or bromine, thiocarbonamide, alkyl-substituted thiocarbonamide, hydroxyl, alkoxy with preferably up to 12 carbon atoms, amino, alkyl-substituted amino with preferably up to 12 carbon atoms, phenyl, sulpho, sulphonamide, alkyl-substituted sulphonamide, and sulphonic acid ester groups; aryl, preferably phenyl or naphthyl, in which case the phenyl rings may be substituted by hydroxy, alkoxy, preferably with up to 12 carbon atoms, alkyl with preferably up to 12 carbon atoms, halogen such as chlorine or bromine, sulphonic acid, and carboxy groups or $R_1$ and $R_2$ together with their linking nitrogen atom may represent a five- or six-membered heterocyclic ring.

$R_3$ represents hydrogen, alkyl with preferably up to five carbon atoms, halogen such as chlorine or bromine, nitro, or nitrile or $R_1$ and $R_3$ together may represent the ring members required to complete a heterocyclic five- or six-membered ring fused to the ring in the formula.

$R_4$ represents nitrile or an acyl group, i.e. radicals derived from an organic carboxylic or sulphonic acid, for example alkyl-sulphonyl with up to 20 carbon atoms, arylsulphonyls, preferably phenyl- or naphthylsulphonyl which, if desired, may be substituted, carboalkoxy with alkyl radical containing up to 20 carbon atoms, carboaryloxy, preferably carbophenoxy, amino-carbonyl whose amino group may be substituted by alkyl with up to 20 carbon atoms, aryl such as phenyl or naphthyl, or heterocyclic groups such as benzthiazolyl, thiadiazolyl and benzthiazolyl-phenyl, the amino group may optionally be substituted by acyl radicals derived from preferably short-chain aliphatic carboxylic acids, or from carbonic acid, carbamic acids and thiocarbamic acids, or may be a member of a five- or six-membered heterocyclic ring for example pyrrolidine; aminothiocarbonyl which may also be substituted as described above, hydrazinocarbonyl, optionally with the substitutents mentioned immediately above, as well as acyl groups derived from aliphatic or aromatic carboxylic acids, for example, benzoyl, acetyl, stearoyl, and propionyl. $R_4$ may in addition represent carboxyl, sulphonic acid or sulphonic acid esters, in particular with aliphatic alcohols; the radicals represented by $R_4$ may in turn by further substituted by nitrile, hydroxyl, mercapto, alkoxy, or carboalkoxy groups.

The compounds listed in the following tables have proved to be particularly suitable:

TABLE I

| No. | $R_1$ | $R_2$ | $R_3$ | $R_4$ | M.P., °C. |
|---|---|---|---|---|---|
| 1 | CH₃ | CH₃ | H | —SO₂—C₆H₄—CH₃ | 220–224 |
| 2 | —CH₂COOH | —CH₂COOH | H | —COOCH₃ | ¹ 214–216 |
| 3 | —CH₂COOH | —CH₂COOH | H | —CONHCH₂COOC₂H₅ | ¹ 181–182 |
| 4 | —CH₂COOH | CH₃ | H | —CONH₂ | ¹ 198–201 |
| 5 | —CH₂COOH | —CH₂COOH | H | —CN | ¹ 214–216 |
| 6 | CH₃ | CH₃ | H | —CN | 182–184 |
| 7 | CH₃ | —CH₂COOH | H | —CN | ¹ 191–193 |
| 8 | —CH₂CH₂CN | —CH₂CH₂CN | H | —CN | 226–228 |
| 9 | H | CH₃ | 3-CH₃ | —CN | 205–207 |
| 10 | CH₃ | —CH₂CH₂COOH | H | —CN | ¹ 149–152 |
| 11 | CH₃ | CH₃ | 3-NO₂ | —CN | 152–154 |
| 12 | CH₃ | CH₃ | 3-Cl | —CN | 207 |
| 13 | CH₃ | CH₃ | H | —COOCH₃ | 127–129 |
| 14 | CH₃ | —CH₂COOH | H | —COOCH₃ | ¹ 129–131 |
| 15 | CH₃ | —CH₂COOH | H | —CONH—(benzothiazolyl-CH₃,CH₃) | ¹ 232–234 |
| 16 | —CH₂CH₂CN | —CH₂CH₂CN | H | —COOCH₃ | 174–178 |
| 17 | H | CH₃ | 3-CH₃ | —COOCH₃ | 199–202 |
| 18 | CH₃ | —CH₂CH₂COOH | H | —COOCH₃ | 112–115 |
| 19 | CH₃ | CH₃ | 3-Br | —COOCH₃ | 88–94 |
| 20 | CH₃ | —CH₂CH₂Cl | H | —COOCH₃ | 123–126 |

Table I—Continued

| No. | R₁ | R₂ | R₃ | R₄ | M.P., °C. |
|---|---|---|---|---|---|
| 21 | CH₃ | 4-OC₂H₅-C₆H₄- | H | —COOCH₃ | 199–202 |
| 22 | CH₃ | 4-OC₂H₅-3-SO₃H-C₆H₃- | H | —COOCH₃ | ¹ >200 |
| 23 | CH₃ | CH₃ | 2-Cl | —COOCH₃ | 174–175 |
| 24 | CH₃ | CH₃ | 3-NO₂ | —COOCH₃ | 160–16 |
| 25 | CH₃ | CH₃ | H | —CSNH₂ | 215–21° |
| 26 | —CH₂COOH | —CH₂COOH | H | —COC₆H₅ | ¹ 222–22° |
| 27 | CH₃ | —CH₂COOH | H | —COC₆H₅ | ¹ 167–169 |
| 28 | CH₃ | —CH₂COOH | H | —CONH-(2-naphthyl) | ¹ 205–208 |
| 29 | —CH₂COOH | —CH₂COOH | H | Same as above | ¹ 252–253 |
| 30 | CH₃ | —CH₂COOH | H | —CONH-(1-naphthyl) | ¹ 196–200 |
| 31 | —CH₂COOH | —CH₂COOH | H | Same as above | ¹ 225–226 |
| 32 | —CH₂COOH | —CH₂COOH | H | —CONH-C₆H₄-(6-methylbenzothiazol-2-yl) | ¹ 261–264 |
| 33 | —CH₃ | —CH₂COOH | H | Same as above | ¹ 241–250 |
| 34 | CH₃ | CH₃ | H | —SO₂CH₃ | 125–131 |
| 35 | CH₃ | CH₃ | H | —CONHCSNH₂ | 243–245 |
| 36 | —CH₃ | —CH₂COOH | H | —SO₂-C₆H₄-CH₃ | 181–183 |
| 37 | —CH₃ | —CH₂COOH | H | —SO₂CH₃ | 218–220 |
| 38 | —CH₃ | —CH₂COOH | H | —CONHC₆H₅ | ¹ 194–198 |
| 39 | —CH₃ | —CH₂COOH | H | —CONHCSNH₂ | 184–190 |
| 40 | —CH₃ | —CH₂CH₂COOH | H | —CONH₂ | 220–223 |
| 41 | —CH₃ | —CH₂CH₂COOH | H | —CONHCH₂CH₂OH | 157–159 |
| 42 | —CH₃ | —CH₂CH₂COOH | H | —CONHCOCH₃ | 120–122 |
| 43 | —CH₂COOH | —CH₂COOH | H | —CONH₂ | ¹ 208–210 |
| 44 | —CH₂COOH | —CH₂COOH | H | —CONHC₆H₅ | ¹ 224–225 |
| 45 | —CH₂COOH | —CH₂COOH | H | —CONHCOCH₃ | ¹ 196–199 |
| 46 | —CH₂COOH | —CH₂COOH | H | —CONHCH₂CH₂OH | ¹ 196–199 |
| 47 | —CH₂COOH | —CH₂COOH | H | —SO₂-C₆H₄-CH₃ | ¹ 221–223 |
| 48 | —CH₂COOH | —CH₂COOH | H | —SO₂CH₃ | ¹ 223–227 |
| 49 | —CH₂COOH | —CH₂COOH | H | —CONHNHC₆H₅ | |
| 50 | —CH₂COOH | —CH₂COOH | H | —CONHCOOC₂H₅ | ¹ 210–212 |
| 51 | —CH₂COOH | —CH₂COOH | H | —CONHCONH₂ | ¹ 208–211 |
| 52 | —CH₂COOH | —CH₂COOH | H | —CONHNHCOCH₃ | |
| 53 | —CH₂COOH | —CH₂COOH | H | —CO-N(tetrahydroquinolinyl) | ¹ 175–177 |
| 54 | CH₃ | —CH₂CH₂COOH | H | Same as above | 207–208 |
| 55 | CH₃ | —CH₂COOH | H | —CSNHC₆H₅ | 205–208 |
| 56 | —CH₃ | —CH₂COOH | H | —CS-N(piperidinyl) | 162–165 |
| 57 | CH₃ | —CH₂COOH | H | —CSNH₂ | 217–219 |
| 58 | CH₃ | CH₃ | H | —CONH-(5-mercapto-1,3,4-thiadiazol-2-yl) | |
| 59 | CH₃ | —CH₂COOH | H | Same as above | 211–213 |
| 60 | CH₃ | —CH₂CH₂COOH | H | do | 229–232 |
| 61 | CH₃ | —CH₂COOH | H | —CONH-(6-methoxybenzothiazol-2-yl) | ¹ 212 |
| 62 | —CH₂COOH | —CH₂COOH | H | Same as above | ¹ 234–235 |

Table I—Continued

| No. | R₁ | R₂ | R₃ | R₄ | M.P., °C |
|---|---|---|---|---|---|
| 63 | CH₃ | —CH₂COOH | H | —CONH—[thiazole-N-C₆H₅] | ¹ 221–225 |
| 64 | —CH₂COOH | —CH₂COOH | H | —CONH—[thiazole] | ¹ 201–203 |
| 65 | —CH₂—C₆H₅ | —CH₂C₆H₅ | H | —CO—⟨C₆H₄⟩—NHCOCH₂CH₂COOH | 95–99 |
| 66 | —CH₂COOH | —CH₂COOH | H | —CO—⟨C₆H₄⟩—NHCOC₁₁H₂₃ | 118–122 |

¹ Piperidine salt.

TABLE II

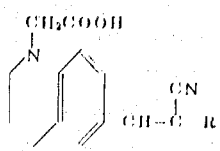

| No. | R | M.P. |
|---|---|---|
| 1 | —CONH₂ | Piperidine salt 196–200° C. |
| 2 | —CN | Piperidine salt 173–177° C. |
| 3 | —COOCH₃ | Piperidine salt 152–154° C. |

The dyes according to the invention are prepared as known per se by condensing the corresponding aldehydes with active cyanomethyl compounds. Condensation may be carried out by heating the components either in the presence or in the absence of solvents, optionally in the presence of acidic or basic condensation agents, as illustrated in the following examples.

COMPOUND 1

Three grams of p-dimethylamino benzaldehyde are heated for 5 minutes with 4 g. of cyanomethyl-p-tolyl sulphone in 50 ml. of ethanol in the presence of 3 ml. of piperidine. Following recrystallization from acetone, 4.1 g. of dye No. 1 in table 1 melting at 220° to 224° C., are obtained in the form of orange-red needles.

COMPOUND 2

Five grams of p-aminobenzaldehyde-N,N-diacetic acid are refluxed for 15 minutes with 2 g. of methyl cyanoacetate and 3.6 g. of piperidine in 20 ml. of ethanol. On cooling, dye No. 2 in table 1 is precipated as the piperidine salt in the form of yellow needles. Following recrystallization from alcohol, 4.8 g. of the dye are obtained, m.p. 214° to 216° C.

COMPOUND 3

2.2 g. of 1,2,3,4-tetrahydroquinoline-6-aldehyde-1-acetic acid and 1.0 g. of cyanacetamide are boiled for 10 minutes with 3 ml. of piperidine in 30 ml. of ethanol. Following isolation and recrystallization from isopropanol, 3 g. of dye No. 1 in table 2 are obtained in the form of the piperidine salt, m.p. 196° to 200° C.

COMPOUND 4

2.4 g. of p-aminobenzaldehyde-N,N-diacetic acid are refluxed for 10 minutes with 1.9 g. of cyano-acetyl glycine ethyl ester in 30 ml. of ethanol and 3 ml. of pyridine. Dye No. 3 in table 1 is precipitated on the addition of glacial acetic acid and can be recrystallized from isopropanol. Yield: 3.6 g. m.p. 181°–182° C.

The aldehydes used for the preparation of these dyes can be obtained by Vilsmeiser-Haak's method (Ber. 60 page 119). The cyanacetamides used are obtained from cyanoacetic ester and the corresponding amines, or from cyanoacetic acid and the amines in acetic anhydride, while the cyanthioacetamides can be prepared from the cyanacetamides by sulphuration with P₂S₅, and the cyanmethyl sulphones prepared from the corresponding sulphonic acids and chloroacetonitrile.

The dyes according to the invention sensitize an electrophotographic layer in the blue region of the spectrum with sensitization maxima between 420 and 480 m/u. These dyes are distinguished by their narrow sensitization range with a steep slope in the sensitization curve towards the long-wave region. This, coupled with their high sensitization intensity make them eminently suitable for the blue sensitization of electrophotographic materials, for example color materials or other materials processed under copying light with a considerable blue component. Another advantage of the dyes according to the invention is the hardly noticeable coloring of the image layers.

The sensitizers according to the invention are added to the layers in such quantities that each square meter of the completed photoconducting layer contains from 0.1 to 10 mg. sensitizer. In general, electrophotographic layers are sensitized by grinding the photoconductor pigment with a solution of the sensitizing dye in a suitable solvent, for example methyl or ethyl alcohol, followed by evaporation of the solvent. As a result, the sensitizing dye is deposited on the surface of the photoconductor pigment grains. The pigment may then be processed with a lacquer binding medium to form the electrophotographic layer as known per se. The dyes according to the invention may be applied with equal success by other sensitizing processes. One of these processes, for example, comprises adding a solution of the sensitizing dye in a liquid inert with respect to the binder, to the photoconductor/binder mixture before dispersion. A further alternative, which has the advantage of yielding electrophotographic layers with hardly any coloring, is embodied in the sensitizing process described in British Patent Specification No. 919,684. Finally, the sensitivity of a completed, nonsensitized photoconductor-binder layer may be displaced into the longer wave region of the visible spectrum by subsequently dipping it into a solution of the sensitizing dye, following by drying. The reference to these alternatives is intended to emphasize that the use of the sensitizing dyes according to the invention is not limited to any specific method of processing.

Neither is the use of the dyes according to the invention limited to specific photoconductor/binder systems. Suitable photoconductors for systems such as these include, above all, the inorganic and organic compounds which, by virtue of their natural coloring, do not show a sensitivity peak in the sensitizing range of the styryl dyes, i.e., for example zinc oxide, titanium dioxide or arsenic trioxide and, on the other hand, organic compounds such as anthracene, and phenanthrene. Suitable vehicle for the process according to the invention include in principle all the film formers used in electrophotography for example silicone resins, alkyd resins, polyurethanes or polyvinyl acetate.

EXAMPLE 1

Ten milligrams of dye No. 10 in table 1 are dissolved in 100 ml. of methyl alcohol. The solution is added to and thoroughly mixed with 100 g. of a photoconductive zinc oxide powder. The solvent is then removed by evaporation at 65° C. To prepare the electrophotographic layer, the zinc oxide thus colored is dispersed in a mixer with 45 ml. of a 60 percent by weight solution of a phenylmethylpolysiloxane resin in toluene, the resulting dispersion is coated on to a baryta paper support and then dried. After it has been charged, the resulting electrophotographic materials is exposed to form an image and developed by a conventional developing process using a toner powder or a liquid aerosol. An excellent reproduction of the original is obtained.

EXAMPLE 2

A ZnO layer is prepared by the procedure described in example 1. In this case, dye No. 10 is replaced by dye No. 3 from table 2. Similar results are obtained when dyes 45, 43, 47, and 35 from table 1 are used.

The spectral sensitivity of the zinc oxide layers prepared as described in the preceding examples is illustrated in the accompanying FIGS. 1 to 7.

FIG. 1 shows the spectral sensitivity curve of a nonsensitized zinc oxide layer.

Figure 2:
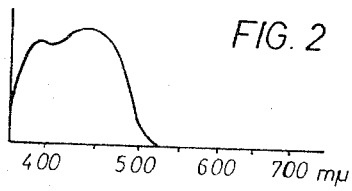
Figure 3:
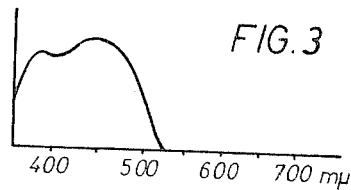
Figure 4:
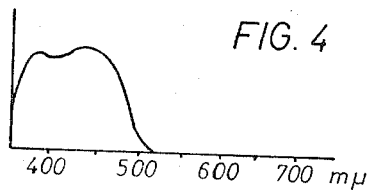
Figure 5:
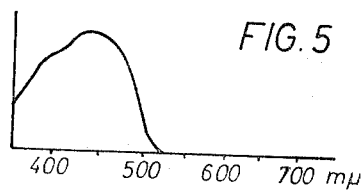
Figure 6:
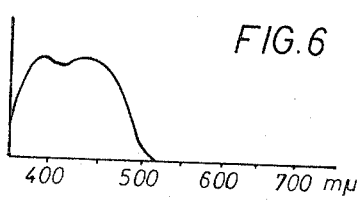
Figure 7:
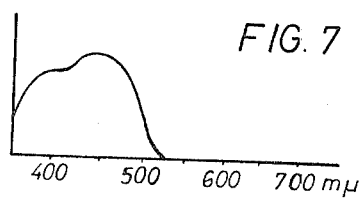

FIG. 2 illustrates the sensitization properties of the material prepared as described in example 1, while FIGS. 3 to 7 relate to the photoconductive layers prepared as described in example 2 using dye Nos. 3 (FIG. 3), 45 (FIG. 4), 43 (FIG. 5), 47 (FIG. 6) and 35 (FIG. 7).

The sensitization curves were obtained as follows: the layer to be examined is exposed with 4,000 Lux. sec. from an image-enlarging lamp (RADIUM R 226, 230v./250 w.) through an interference sky filter, VERIL B 60, a product of Messrs. Schotten and Genossen.

The filter is covered by a transparent grey step wedge so that a curve path appears in the photoconductive layer as the developable image. The path is reproduced in the accompanying Figures in the form of a line drawing. The height of the ordinates of the maximum of this sensitization curve enables the effectiveness of the sensitizing dye to be assessed, while the abcissae enable the position of the sensitization maximum in the visible range of the spectrum to be determined.

In every case, the electroaerosol process described in British Patent Specification No. 944,645 was used to make the filter exposures visible.

The photoconductive materials according to the invention may be used for any type of electrophotographic process, for example for developing process in which a solid, dustlike toner powder is used, for aerosol developing processes, electrophoretic processes or for so-called wetting-type developing processes. The materials according to the invention are suitable both for processes in which electrostatic charged images are processed, and for processes in which conduction images are processed.

We claim:

1. A photosensitive electrophotographic material comprising at least one photoconductive material consisting of zinc oxide dispersed in a binder and a sensitizing dye contained in the photoconductive material in the amount of 0.1 to 10 mg. per square meter of sensitizing dye, the sensitizing dye being of the formula

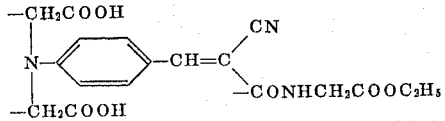

2. A photosensitive electrophotographic material comprising at least one photoconductive material consisting of zinc oxide dispersed in a binder and a sensitizing dye contained in the photoconductive material in the amount of 0.1 to 10 mg. per square meter of sensitizing dye, the sensitizing dye being of the formula

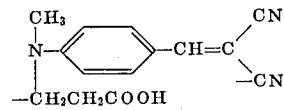

3. A photosensitive electrophotographic material comprising at least one photoconductive material consisting of zinc oxide dispersed in a binder and a sensitizing dye contained in the photoconductive material in the amount of 0.1 to 10 mg. per square meter of sensitizing dye, the sensitizing dye being of the formula

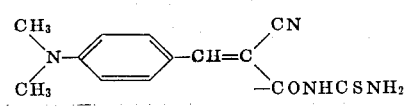

4. A photosensitive electrophotographic material comprising at least one photoconductive material consisting of zinc oxide dispersed in a binder and a sensitizing dye contained in the photoconductive material in the amount of 0.1 to 10 mg. per square meter of sensitizing dye, the sensitizing dye being of the formula

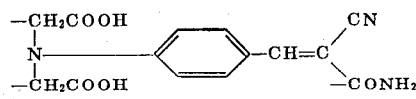

5. A photosensitive electrophotographic material comprising at least one photoconductive material consisting of zinc oxide dispersed in a binder and a sensitizing dye contained in the photoconductive material in the amount of 0.1 to 10 mg. per square meter of sensitizing dye, the sensitizing dye being of the formula

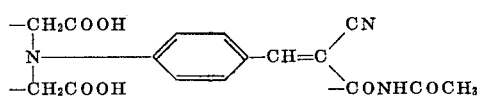

6. A photosensitive electrophotographic material comprising at least one photoconductive material consisting of zinc oxide dispersed in a binder and a sensitizing dye contained in the photoconductive material in the amount of 0.1 to 10 mg. per square meter of sensitizing dye, the sensitizing dye being of the formula

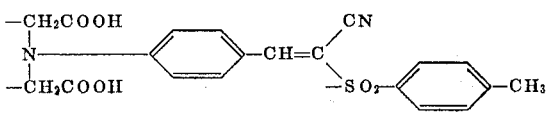

* * * * *